United States Patent [19]
Takano et al.

[11] Patent Number: 5,251,139
[45] Date of Patent: Oct. 5, 1993

[54] VEHICULAR TRAVELING DIRECTION MEASURING SYSTEM

[75] Inventors: Kenji Takano; Hiroshi Tsuda; Toshiyuki Itoh, all of Kanagawa, Japan

[73] Assignee: Nissan Motor Co., Ltd., Japan

[21] Appl. No.: 607,923

[22] Filed: Nov. 1, 1990

[30] Foreign Application Priority Data

Nov. 2, 1989 [JP] Japan .................................. 1-284811

[51] Int. Cl.⁵ .............................................. G06F 15/50
[52] U.S. Cl. .................................... 364/454; 364/449; 33/356
[58] Field of Search ............... 364/443, 449, 453, 454, 364/457; 33/356, 357, 355 R; 73/178 R

[56] References Cited

U.S. PATENT DOCUMENTS

| | | | |
|---|---|---|---|
| 4,862,398 | 8/1989 | Shimizu et al. | 364/457 |
| 5,023,799 | 6/1991 | Nakayama et al. | 364/457 |
| 5,040,122 | 8/1991 | Neukirchner et al. | 364/449 |
| 5,067,083 | 11/1991 | Nakayama et al. | 364/453 |

FOREIGN PATENT DOCUMENTS

| | | |
|---|---|---|
| 58-34483 | 2/1983 | Japan . |
| 59-100812 | 6/1984 | Japan . |
| 59-202014 | 11/1984 | Japan . |
| 2216272 | 10/1989 | United Kingdom . |

*Primary Examiner*—Gary Chin
*Attorney, Agent, or Firm*—Lowe, Price, LeBlanc & Becker

[57] ABSTRACT

A system for measuring a traveling direction of a vehicle includes a geomagnetic sensor and a gyro sensor. The system utilizes first and second indicies for deriving the vehicle traveling direction. The first index is indicative of disturbance of a geomagnetic field on a short interval basis, and the second index is indicative of disturbance of the geomagnetic field on a long interval basis. The system further utilizes a correction value indicative of a drift error caused by the gyro sensor for deriving the vehicle traveling direction. The system varies a rate of dependence upon an output of the geomagnetic sensor and an output of the gyro sensor based on the first and second indicies and the correction value when calculating the vehicle traveling direction.

14 Claims, 11 Drawing Sheets

VEHICULAR TRAVELING DIRECTION MEASURING SYSTEM

BACKGROUND OF THE INVENTION

1. Field of the Invention

This invention relates generally to a system for measuring a traveling direction of a vehicle and, more specifically, to a vehicular traveling direction measuring system which can derive an accurate traveling direction of a vehicle by utilizing a geomagnetic sensor and a gyro sensor.

2. Description of the Background Art

One previously proposed system for measuring a vehicle traveling direction is exemplified by Japanese First Patent Publication No. 58-34483.

In this publication, a system utilizing a geomagnetic sensor which provides an absolute traveling direction of the vehicle, and a gyro sensor which provides a relative variation in traveling directions of the vehicle is disclosed. The system is adapted to measure the traveling direction of the vehicle by utilizing the combination of outputs from the geomagnetic sensor and the gyro sensor, as will be described hereinbelow with reference to FIG. 1.

Figure 1:
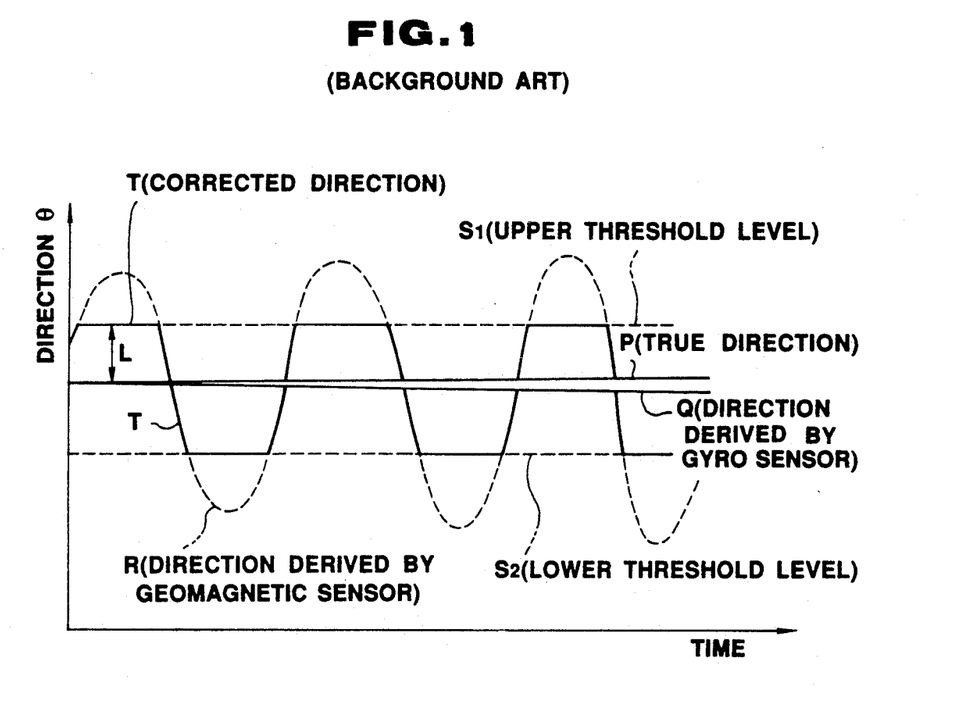
FIG. 1 is a graph of time versus direction showing the vehicular traveling direction measurement characteristics performed by the background art.

Assuming the vehicle is running in a direction P on a straight road where the geomagnetism environment is unfavorable, a traveling direction derived by the gyro sensor becomes a straight line Q which is stable and close to the direction P because the gyro sensor is, as is known, not affected by environmental geomagnetic conditions. Deviation between the directions P and Q is caused by an error due to drift of the gyro sensor. Since the error is accumulated with a lapse of time or increment of distance travelled by the vehicle, the deviation between the directions P and Q gets larger as shown in FIG. 1. On the other hand, because the direction derived by the geomagnetic sensor is affected by the environmental geomagnetism, it is exemplarily described as a sine curve R in FIG. 1.

Accordingly, when the vehicle traveling direction is measured solely based on the output of the geomagnetic sensor as disclosed, for example, in Japanese First Patent Publication No. 59-100812, an error between the true vehicle traveling direction P and the measured traveling direction R becomes considerably large. On the other hand, when the vehicle traveling direction is measured solely based on the gyro sensor as disclosed, for example, in Japanese First Patent Publication No. 59-202014, an error between the true vehicle traveling direction P and the measured traveling direction Q gets larger with the lapse of time as mentioned above.

In order to overcome the above-mentioned defects, predetermined constant lower and upper threshold levels S1 and S2 are set as shown in FIG. 1, which are selected by deriving difference between the directions R and Q measured by the geomagnetic sensor and the gyro sensor, respectively. When the direction R exceeds the threshold level S1 or S2, the direction R is corrected to be equal to the threshold level S1 or S2 so as to obtain a directional line T which is held as a measured traveling direction of the vehicle. Accordingly, the direction R obtained by the geomagnetic sensor is corrected by the direction Q obtained by the gyro sensor to reduce the error to a difference L between the threshold level and the true traveling direction P of the vehicle.

However, as is clear from FIG. 1, the error L is still considerably large. Therefore, when a geographical position of the vehicle is calculated using the corrected directional line T, a difference between a true position of the vehicle and a calculated position of the vehicle gets larger with the lapse of time because the error is accumulated with the lapse of time.

Further, because the gyro sensor is utilized only for setting the threshold levels to provide a stabler output of the geomagnetic sensor, the most advantageous aspect of the gyro sensor, that is, providing a relative directional variation with high accuracy without being affected by environmental geomagnetism, is not effectively utilized.

SUMMARY OF THE INVENTION

Therefore, it is an object of the present invention to provide a system for measuring a traveling direction of a vehicle that can eliminate the above-noted defects inherent in the background art.

It is another object of the present invention to provide a system for measuring a traveling direction of a vehicle that can provide an accurate measured traveling direction of the vehicle by changing, when calculating the vehicle traveling direction, a rate of dependence upon an output of a geomagnetic sensor and an output of a gyro sensor according to a derived environmental geomagnetic condition as well as a derived reliability of an output from the gyro sensor. Accordingly, an inherent feature of the geomagnetic sensor, that is, being capable of providing an absolute direction while liable to be affected by environmental geomagnetic field, and an inherent feature of the gyro sensor, that is, being capable of providing a relative directional variation with high accuracy without being affected by the environmental geomagnetic field while being subject to generation of a drift, are effectively utilized in the system.

To accomplish the above-mentioned and other objects, according to one aspect of the present invention, a system for measuring a traveling direction of a vehicle comprises:

a geomagnetic sensor, mounted to the vehicle, which produces a first output signal indicative of directional data relating to a geomagnetic field around the vehicle; a gyro sensor, mounted to the vehicle, which produces a second output signal indicative of angular variation data independently of the geomagnetic field; and a control circuit operatively connected to said geomagnetic sensor and the gyro sensor for receiving the first and second output signals to derive a traveling direction therefrom, the control circuit including: first means for deriving a first variation in a traveling direction of the vehicle based on the second output signal from the gyro sensor; second means for deriving a first vehicle traveling direction based on the first directional variation; third means for deriving a second vehicle traveling direction based on the first output signal from the geomagnetic sensor; fourth means for deriving a second variation in the second vehicle traveling direction; fifth means for deriving a first value indicative of a disturbance of the geomagnetic field on a short interval basis, the first short interval based value being derived by calculating a difference between the first and second direction variations; sixth means for deriving a second value indicative of a disturbance of the geomagnetic field on a long interval basis, the second long interval based value being derived by calculating a difference between the first and second vehicle traveling directions; seventh means for deriving a first correction value indicative of a drift error caused by the gyro sensor; and eighth means for deriving a third vehicle traveling direction based on the first and second derived vehicle traveling directions by changing a rate of dependence upon the first and second vehicle traveling direction depending on the first short interval based value, the second long interval based value and the first correction value.

BRIEF DESCRIPTION OF THE DRAWINGS

The present invention will be understood more fully from the detailed description given hereinbelow and from the accompanying drawings of the preferred embodiment of the invention, which are given by way of example only, and are not intended to be limitative of the present invention.

In the drawings.

DESCRIPTION OF THE PREFERRED EMBODIMENT

Figure 2:
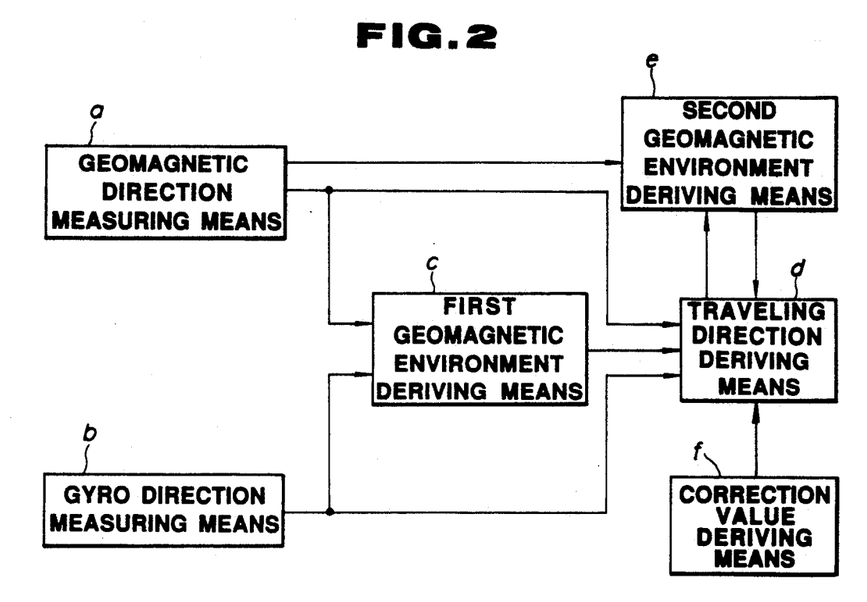
FIG. 2 is a schematic block diagram showing the general construction of a system for measuring a traveling direction of a vehicle according to the present invention.

Referring now to the drawings, particularly to FIG. 2, the general and fundamental concept of a system for measuring a traveling direction of a vehicle, according to the present invention, is illustrated in a form of functional blocks.

As seen from FIG. 2, the system includes a geomagnetic direction measuring means (a) which provides a traveling direction of the vehicle using a geomagnetic sensor, and a gyro direction measuring means (b) which provides a traveling direction of the vehicle using a gyro sensor. The system also includes a first geomagnetic environment deriving means (c) for providing a first geomagnetic environment value $\beta$ indicative of a disturbance of the geomagnetic field per short interval, for example, of the order of several meters. Specifically, the first means (c) calculates a difference between a variation of a vehicle traveling direction measured by the geomagnetic direction measuring means (a) and a variation of a vehicular traveling direction measured by the gyro direction measuring means (b), per a predetermined unit interval, such as, a predetermined unit distance travelled by the vehicle. This difference is used as the first geomagnetic environment value $\beta$.

Practically, the calculation by the first means (c) may be first performed per a predetermined unit time travelled by the vehicle and then converting the calculated value to a value per a predetermined unit distance travelled by the vehicle.

The system further includes a second geomagnetic environment deriving means (e) for providing a second geomagnetic environmet value $\gamma$ indicative of a disturbance of the geomagnetic field per long interval, for example, of the order of several 10 to several 100 meters. Specifically, the second means (e) calculates a difference between the vehicle traveling direction derived by the geomagnetic direction measuring means (a) and a traveling direction of the vehicle derived based on the directional variation measured by the gyro direction measuring means and a vehicular traveling direction derived by below-noted vehicular traveling direction deriving means (d) in a prior cycle of the system, per a predetermined unit interval, such as, a predetermined unit distance travelled by the vehicle. This difference is used as the second geomagnetic environment value $\gamma$.

Practically, the calculation by the second means (e) may be first performed per a predetermined unit time travelled by the vehicle and then converting the calculated value to a value per a predetermined unit distance travelled by the vehicle.

The system further includes correction value deriving means (f) for deriving a gyro drift correction value $\alpha$ based on an elapsed time from a time point where a correction of a gyro sensor drift error (zero-point correction) is performed and a drift characteristic of the gyro sensor. The gyro drift correction value $\alpha$ is used by the vehicular traveling direction deriving means (d) for compensating an error caused by the gyro sensor drift so as to derive a vehicle traveling direction having no substantial drift error.

Finally, the vehicle traveling direction deriving means (d) derives the vehicle traveling direction by calculating the outputs from the geomagnetic direction measuring means (a) and the gyro direction measuring means (b), changing a rate of dependence upon those outputs based on the first and second magnetic environment values $\beta$ and $\gamma$ and the gyro drift correction value $\alpha$.

Assuming that the measurement of the vehicle traveling direction is performed solely by the geomagnetic sensor, it is possible to obtain an accurate measured direction normally, i.e. when the geomagnetic disturbance is not substantial, while it is impossible to obtain an accurate measured value when the geomagnetic disturbance is substantial. On the other hand, if the measurement of the vehicle traveling direction is performed solely by the gyro sensor, a measurement error caused by the drift of the gyro sensor is accumulated with the distance travelled by the vehicle. Accordingly, it is possible to obtain a reliable result for a short distance, while largely deviating from the true traveling direction over long distances.

In order to utilize the features of both sensors, the system according to the present invention uses the first and second geomagnetic environment values $\beta$ and $\gamma$ as well as the gyro drift correction value $\alpha$ as described above. By varying the rate of dependence upon the geomagnetic sensor and the gyro sensor, not in an ON-OFF fashion but continuously, using the first and second geomagnetic environment values $\beta$ and $\gamma$ and the gyro drift correction value $\alpha$, the system is capable of providing an accurate measured traveling direction without being adversely affected by the magnetic disturbance and drift of the gyro sensor.

Now a preferred embodiment of the vehicular traveling direction measuring system according to the present invention will be described with reference to FIGS. 3 to 11.

Figure 3:
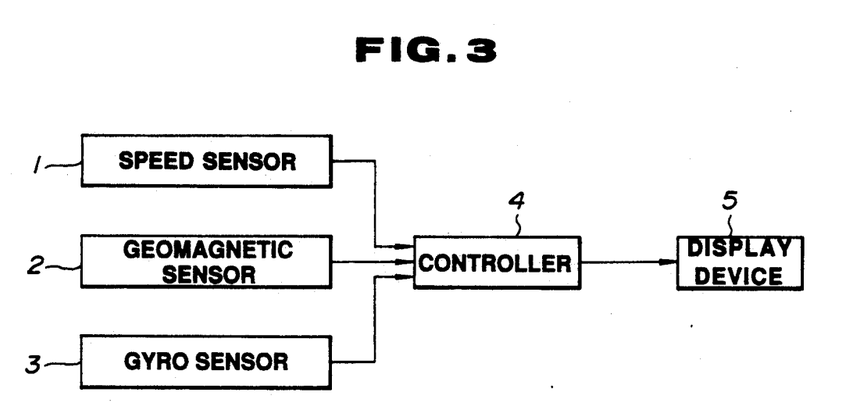
FIG. 3 is a schematic block diagram showing a preferred embodiment of the present invention.

FIG. 3 shows a block diagram of the vehicular traveling direction measuring system of the preferred embodiment. In FIG. 3, a speed or distance sensor 1 outputs a signal indicative of a distance travelled by the vehicle to a controller 4. The speed sensor 1 may be in the form of, such as a photoelectric, electromagnetic or mechanical-contact sensor which outputs pulse signals in proportion to the number of rotations of a tire. A geomagnetic sensor 2 outputs a signal indicative of an absolute traveling direction of the vehicle to the controller 4. A rate gyro sensor 3 outputs a signal indicative of variation in the traveling direction of the vehicle to the controller 4.

The controller 4 comprises, for example, a microcomputer and receives the outputs from the speed sensor 1, the geomagnetic sensor 2 and the rate gyro sensor 3 as described above. The controller 4 counts the pulses output from the speed sensor 1 and calculates the distance travelled by the vehicle. The controller 4 further calculates a vehicle traveling direction based on the outputs from the geomagnetic sensor 2 and the rate gyro sensor 3 to determine a position of the vehicle on a two-dimensional coordinate or an X-Y coordinate per a predetermined unit distance travelled by the vehicle.

A display device 5, such as a CRT (cathode-ray tube) display device and a liquid crystal display device, renews and displays in sequence a current position of the vehicle based on the positional data output from the controller 4.

General operation of the vehicular traveling direction measuring system of the preferred embodiment will be described hereinbelow with reference to FIG. 4 which shows a flowchart to be executed for sequentially deriving the current position of the vehicle on the X-Y coordinate.

Immediately after the power is first applied to the controller 4, the process goes to an initialize step 100 where an initialize routine is executed. At a subsequent step 102, a current position of the vehicle is set by keyboard-input, and then at a step 104, the current position of the vehicle and a peripheral map are displayed on the display device 5.

When interrupt is allowed at an allow interrupt step 106, then the process goes to a main loop comprising steps 112 and 114. In this main loop, when it is determined at the step 112 based on results from interrupt routine steps 108 and 110 that the current position of the vehicle has been changed, the current position of the vehicle and the peripheral map are renewed at the step 114.

Figure 4:
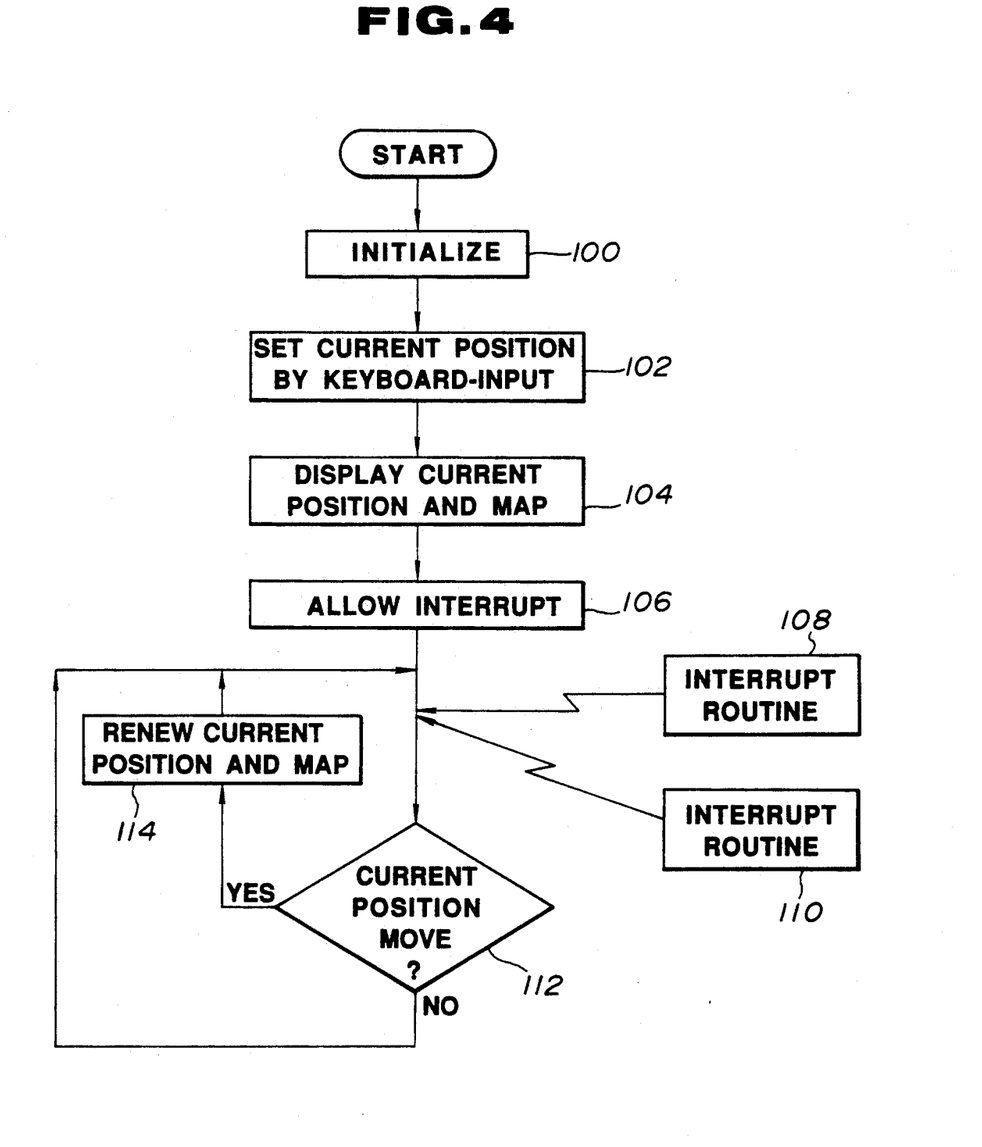
FIG. 4 is a general flowchart to be executed by a controller in the preferred embodiment of FIG. 3.
Figure 5:
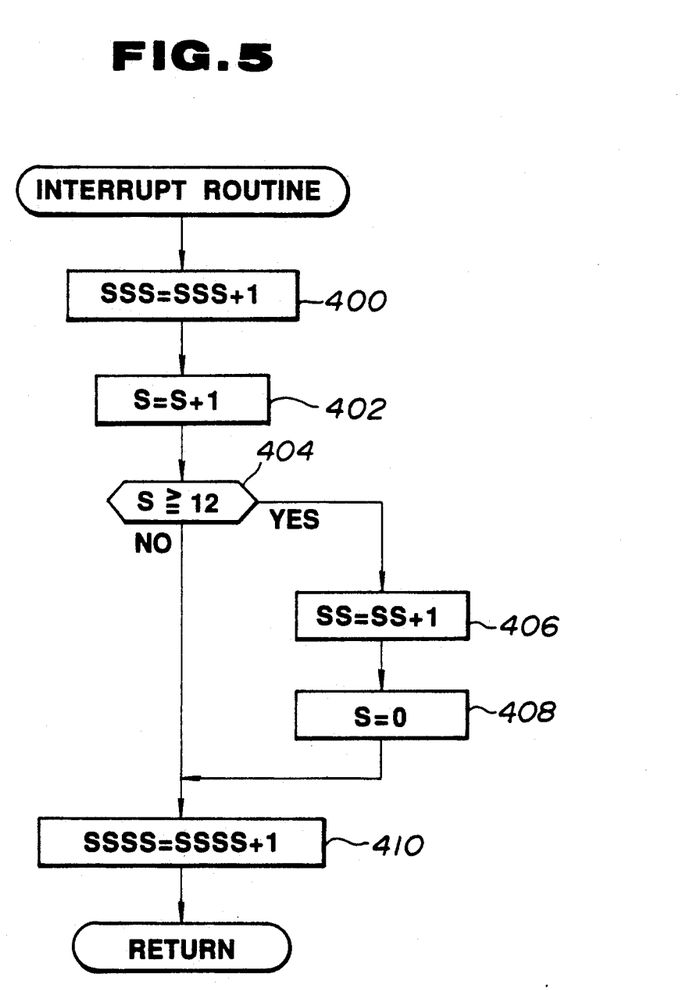
FIG. 5 is a flowchart showing an interrupt routine to be executed per a predetermined distance by the controller in the preferred embodiment of FIG. 3.

FIG. 5 shows a flowchart of the interrupt routine identified as step 108 in FIG. 4. This interrupt routine is executed per a predetermined distance $\Delta D$ travelled by the vehicle. Specifically, when the speed sensor 1 outputs 24 pulses per one rotation of the tire, then $\Delta D$ is, for example, 6 to 7 centimeters, which however is variable according to an outer diameter of the tire, and the interrupt routine is executed 24 times per one rotation of the tire.

In FIG. 5, a counter SSS is counted up by 1 per every execution of the interrupt routine at a step 400 and is used for determining whether the vehicle is stopped. A counter S is also counted up by 1 per every execution of the interrupt routine at a step 402, and a counter SS is counted up by 1 per every 12 executions (per half rotation of the tire) of the interrupt routine as shown at steps 404 and 406. Specifically, the counter SS is counted up by 1 in response to the counter S counting up 12 times. The counter S is reset to zero at a step 408. These counters S and SS are used for calculating the vehicle traveling direction, as will be described later. A counter SSSS is counted up by 1 per every execution of the interrupt routine at step 410 and is used for calculating the current position of the vehicle, which will be also described later.

Figure 6A:
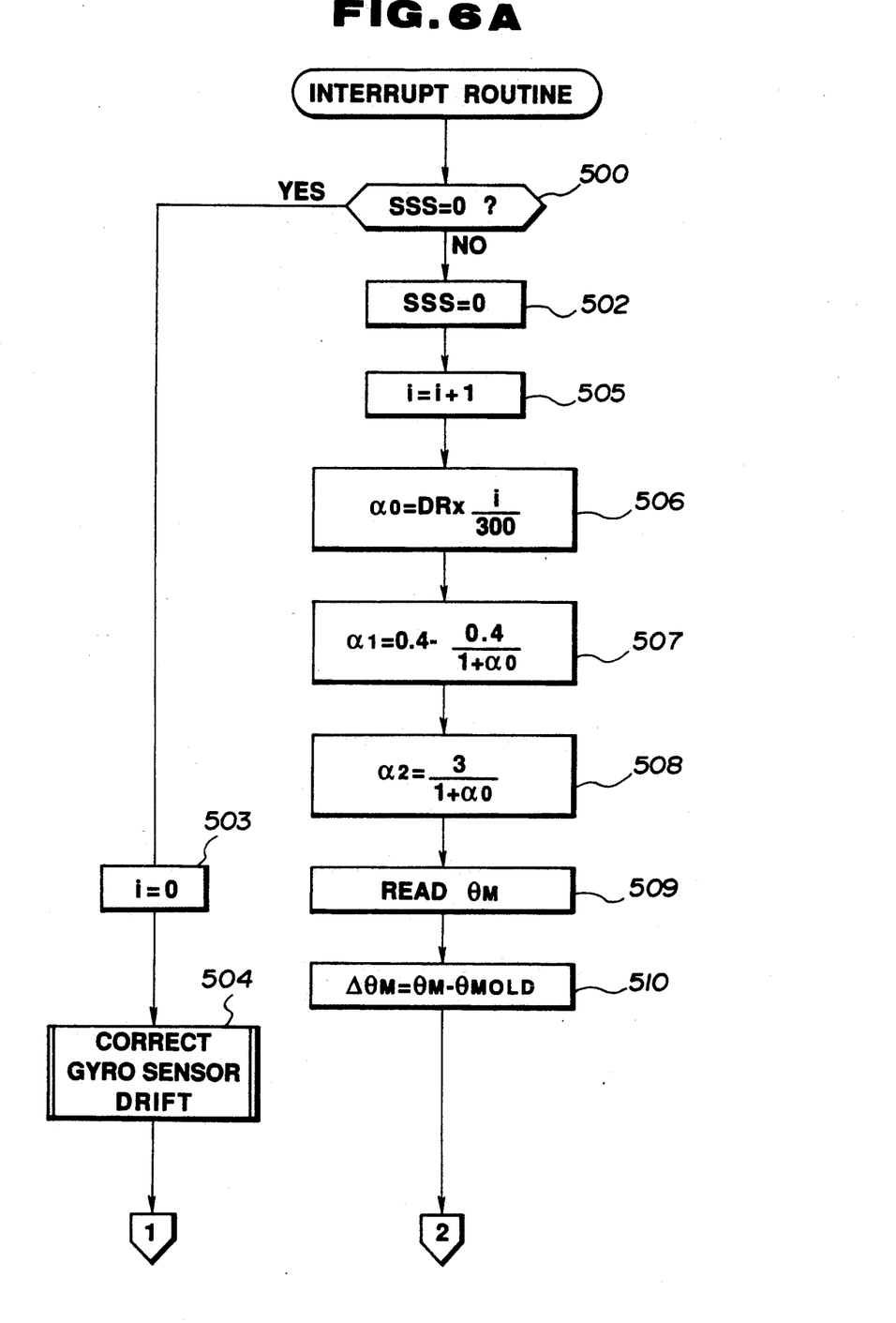
FIGS. 6A, 6B and 6C are flowcharts showing an interrupt routine to be executed per a predetermined time by the controller in the preferred embodiment of FIG. 3.
Figure 6B:
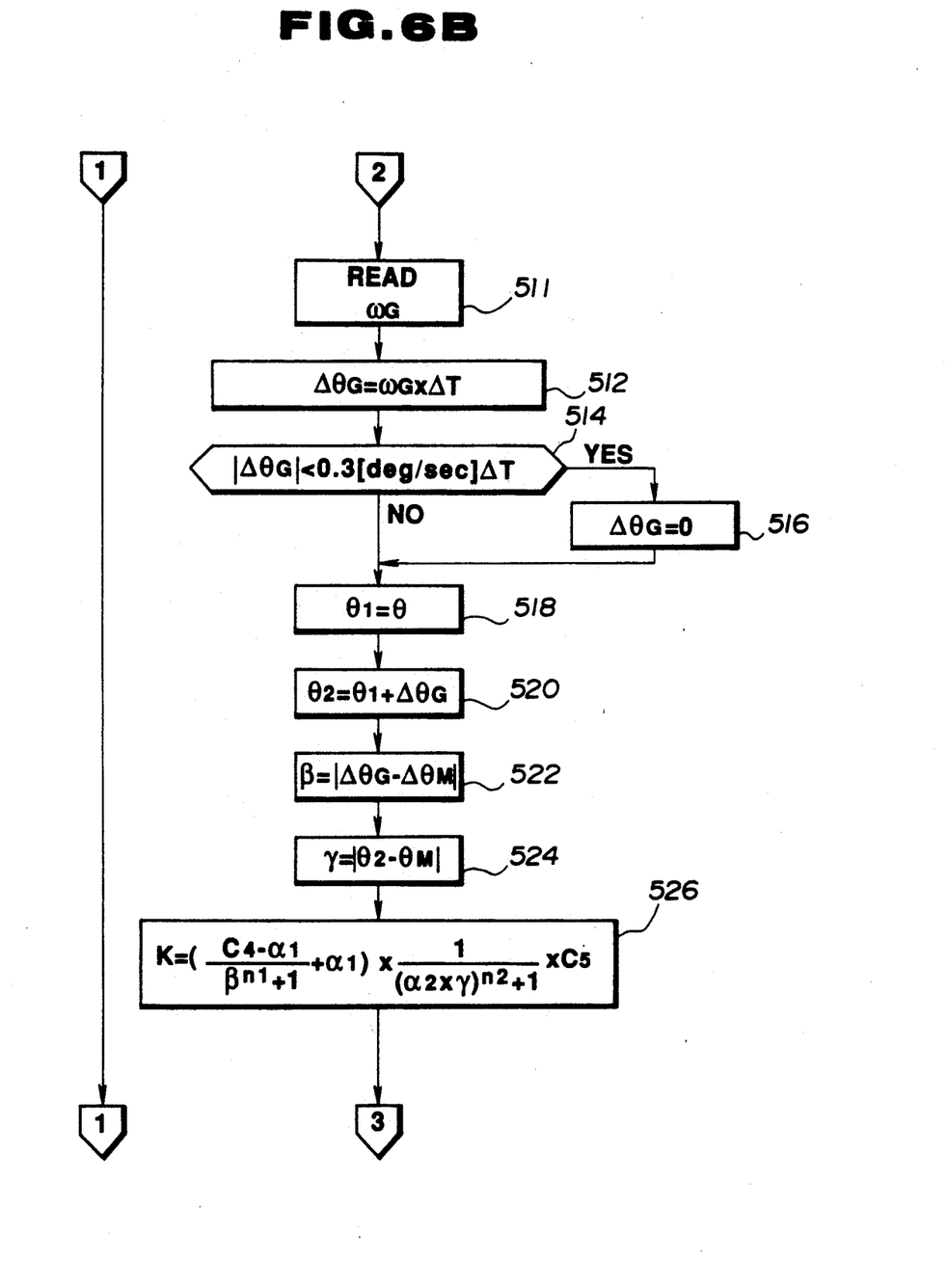
Figure 6C:
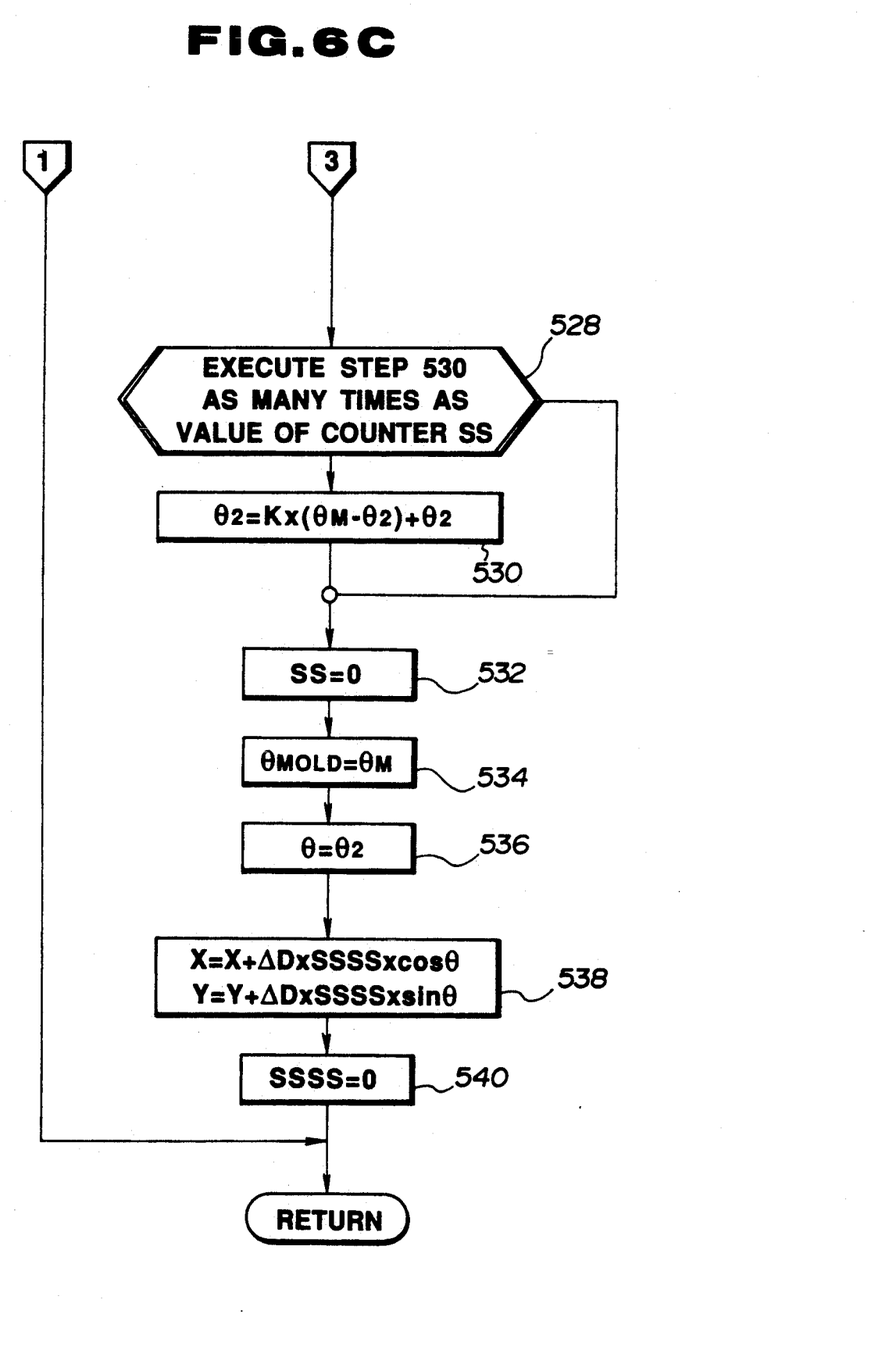

FIGS. 6A, 6B and 6C show a flowchart of the interrupt routine identified as the step 110 in FIG. 4. This interrupt routine is executed per a predetermined unit time $\Delta T$, for example, every 100 msec.

In FIG. 6A, a step 500 determines whether the vehicle is stopped, i.e. whether a value of the counter SSS is zero. When the value of the counter SSS is zero, i.e. an answer at the step 500 is YES, which means that the vehicle is stopped and no variation of the traveling direction is possible, then the routine goes to a step 504 via a step 503 bypassing a subsequent traveling direction calculation routine. At the step 504, correction of the gyro sensor drift is performed. Since an angular velocity of the vehicle should be zero when it is stopped, an output of the gyro sensor 3 is considered to be a product of gyro sensor drift. At the step 503, a counter value i is reset to zero. The counter value i is counted up by 1 per every execution of a step 505 for deriving an elapsed time commencing from a time point where the correction of gyro sensor drift is performed at the step 504.

On the other hand, when the answer at the step 500 is NO, that is, the vehicle is moving, the counter SSS is reset to zero at a step 502, and the routine goes to the step 505. At the step 505, as described above, the counter value i is increased by 1 per every execution of the step 505 so as to count the elapsed time commencing from the time point of the correction of the gyro sensor drift at the step 504. Subsequently, at a step 506, a first gyro drift correction value $\alpha_0$ is derived using the elapsed time derived at the step 505 and a drift characteristic of the gyro sensor (a drift error of the gyro sensor per unit time, which is normally 0.01 deg/sec to 0.1 deg/sec) which has been measured in advance. This first correction value $\alpha_0$ is used at subsequent steps 507 and 508 to derive second and third gyro drift correction values $\alpha_1$ and $\alpha_2$ respectively. Specifically, the first to third correction values $\alpha_0$, $\alpha_1$ and $\alpha_2$ are derived based on the following equations, respectively:

$$\alpha_0 = DR \times \frac{i}{C_1}$$

$$\alpha_1 = C_2 - \frac{C_2}{1 + \alpha_0}$$

$$\alpha_2 = \frac{C_3}{1 + \alpha_0}$$

where, DR is the drift characteristic of the gyro sensor 3, i is the elapsed time derived at the step 505, and $C_1$, $C_2$ and $C_3$ are all constants. These constants are set, for example, to the following values:

$C_1 = 300$ $C_2 = 0.4$ $C_3 = 4$

As appreciated from the above-noted equations, the first and second correction values $\alpha_0$ and $\alpha_1$ become larger with the elapsed time i being larger, while the third correction value $\alpha_2$ becomes less with the elapsed time i being larger.

Now, the routine proceeds to a step 509 where the absolute traveling direction $\theta_M$ of the vehicle measured by the geomagnetic sensor 2 is read out, and at a subsequent step 510, a difference $\Delta\theta_M$ between the absolute direction $\theta_M$ and a prior absolute direction $\theta_{MOLD}$ is derived. The prior absolute direction $\theta_{MOLD}$ is an absolute direction $\theta_M$ which has been derived during the prior execution of the interrupt routine and is stored at a step 534 in sequence for a subsequent execution of the interrupt routine.

At a subsequent step 511 (FIG. 6B), an angular velocity $\psi_G$ in a yawing direction of the vehicle measured by the gyro sensor 3 is read out, and at a step 512, a directional variation $\Delta\theta_G$ is calculated by $\psi_G \times \Delta T$. When an absolute value of $\Delta\theta_G$ is determined less than 0.3 (deg/sec)$\Delta T$ at a step 514, the routine goes to a step 516 where $\Delta\theta_G$ is set to zero. Accordingly, through the steps 514 and 516, the directional variation $\Delta\theta_G$ is disregarded during a subsequent calculation routine when the absolute value of $\Delta\theta_G$ is less than the predetermined value. Specifically, as described above, because the measuring error caused by the drift is inherent to the gyro sensor, though the drift error is small in one execution of the interrupt routine, it becomes considerably large through integration as the interrupt routine is executed repeatedly. Accordingly, the steps 514 and 516 prevent the directional variation caused by the gyro sensor drift from being integrated during the interrupt routine.

Through steps 518 to 530, the traveling direction of the vehicle is calculated based on the data obtained by the outputs of the geomagnetic and gyro sensors 2 and 3.

At the step 518, a traveling direction $\theta$ of the vehicle derived by the prior execution of the interrupt routine and stored at a step 536 is set to $\theta_1$. Subsequently, at the step 520, the directional variation $\Delta\theta_G$ derived at the step 512 is added to the direction $\theta_1$ so as to derive a direction $\theta_2$. Accordingly, the direction $\theta_2$ only includes the directional variation derived by the gyro sensor 3 in the current routine.

At the steps 522 and 524, the geomagnetic environment indicies $\beta$ and $\gamma$ are calculated. The geomagnetic environment index $\beta$ derived at the step 522 corresponds to the output value derived from the first geomagnetic environment deriving means (c) in FIG. 2, and the geomagnetic environment index $\gamma$ derived at the step 524 corresponds to the output value derived from the second geomagnetic environment deriving means (e) in FIG. 2.

The geomagnetic environment index $\beta$ is calculated by the following equation:

$$\beta = |\Delta\theta_G - \Delta\theta_M|$$

and is indicative of a difference between the outputs of the geomagnetic sensor 2 and the gyro sensor 3 over a short distance or a short time, and thus is indicative of a disturbance of the geomagnetic field over a short distance or a short time, for example, of the order of several meters.

The magnetic environment index $\beta$ has the following meaning:

When the vehicle is running on an elevated road, a disturbance component is increased in the output of the geomagnetic sensor per several meters travelled by the vehicle. It is considered that this increment of the disturbance component is caused by metallic structural members of the elevated road. Further, when the vehicle is traveling on a road under an elevated road, the disturbance component is also increased in the output of the geomagnetic sensor per several meters travelled by the vehicle due to supporting posts arranged on both sides of the road for supporting the elevated road. The geomagnetic environment index $\beta$ is a numeric value for defining the above-noted disturbance component over a short distance or a short time. Accordingly, the geomagnetic environment index $\beta$ is derived by comparing the output of the gyro sensor which is considered to be accurate over short distances and the output of the geomagnetic sensor.

On the other hand, the magnetic environment index $\gamma$ is calculated by the following equation:

$$\gamma = |\theta_2 - \theta_M|$$

and is indicative of a difference between the direction $\theta_2$ derived at the step 520 and the absolute direction $\theta_M$ read out at the step 509, and thus is a numeric value indicative of a disturbance of the geomagnetic field, i.e. the disturbance of the output of the geomagnetic sensor, over a distance (for example, of the order of several 10 to several 100 meters) longer than that for the geomagnetic environment index $\beta$. This long distance based disturbance of the geomagnetic field is likely to occur, for example, when the vehicle is running close to and in parallel with a railroad or on a road under which a subway is extended.

Figure 7:
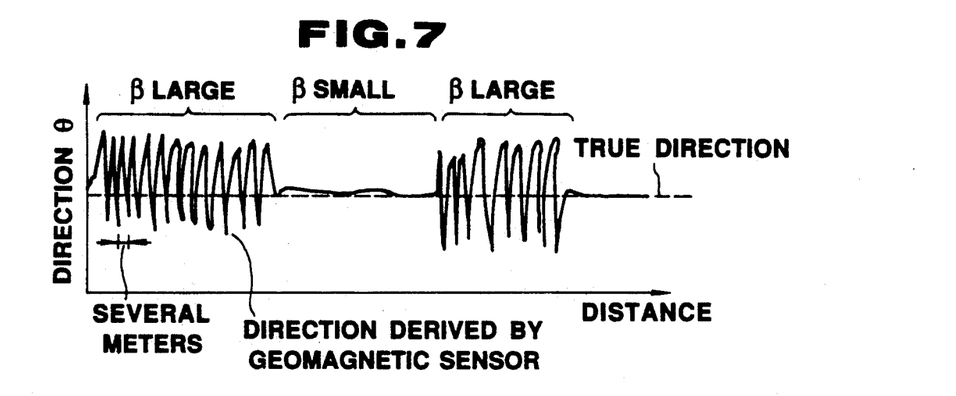
FIG. 7 is a graph of distance versus direction showing an influence of short distance based disturbance of the geomagnetic field upon measurement of the vehicle traveling direction.
Figure 8:
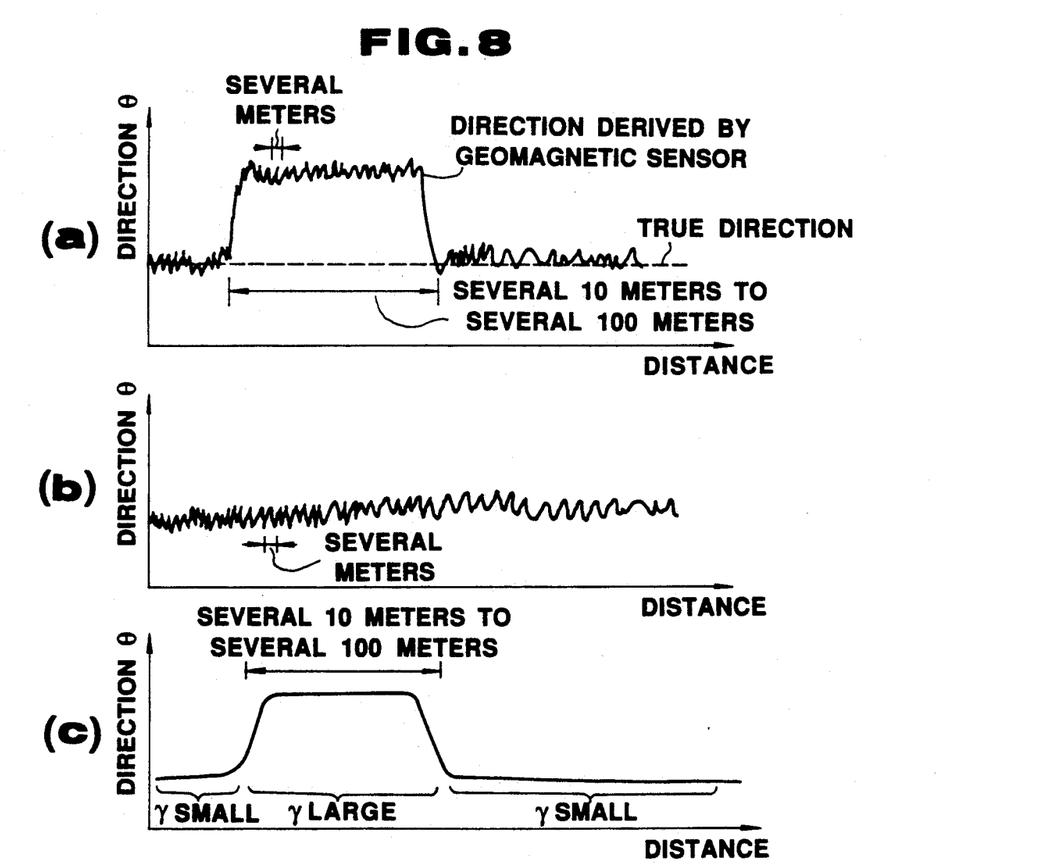
FIG. 8(a) is a graph of distance versus direction showing an influence of short and long distance based disturbances of the geomagnetic field upon measurement of the vehicle traveling direction.
FIG. 8(b) is a graph of distance versus direction showing an influence of short distance based disturbance of the geomagnetic field upon the measurement of vehicle traveling direction.
FIG. 8(c) is a graph of distance versus direction showing an influence of long distance based disturbance of the geomagnetic field upon measurement of the vehicle traveling direction.

FIGS. 7 and 8 respectively show graphs of distance versus vehicle traveling direction measured by the geomagnetic sensor 2. In FIGS. 7 and 8(a), a true traveling direction of the vehicle is indicated by a dotted line, that is, the vehicle is traveling straight in the same direction.

FIG. 7 shows one example wherein the short distance based disturbance of the geomagnetic field is large. The solid line shows the vehicle traveling direction derived by the geomagnetic sensor, which largely deviates from the true traveling direction of the vehicle. The geomagnetic environment index $\beta$ varies largely in this example.

FIG. 8(a) shows another example wherein the short distance based disturbance and the long distance based disturbance of the geomagnetic field are included. FIG. 8(b) shows the solid line of FIG. 8(a) extracting the short distance based disturbance component only, while FIG. 8(c) shows the solid line of FIG. 8(a) extracting the long distance based disturbance component only. In this example, the short distance based disturbance is less than that in FIG. 7, i.e. the variation of the geomagnetic environment index $\beta$ is less, while the long distance based disturbance is large, i.e. the variation of the geomagnetic environment index $\gamma$ is large.

Referring back to FIG. 6B, a coefficient K is calculated at the step 526 based on the following equation (1).

$$K = \left( \frac{C_4 - \alpha_1}{\beta^{n1} + 1} + \alpha_1 \right) \times \frac{1}{(\alpha_2 \times \gamma)^{n2} + 1} \times C_5 \quad (1)$$

The coefficient K is a numeric value for determining how fast the direction $\theta_2$ derived at the step 520 is to approach the absolute direction $\theta_M$ read out at the step 509, which will be described later.

In the equation (1), the geomagnetic environment indicies $\beta$ and $\gamma$ are the values derived at the steps 522 and 524, respectively, and $\alpha_1$ and $\alpha_2$ are the values derived at the steps 507 and 508, respectively, and $C_4$, $C_5$, n1 and n2 are all constants. These constants are set, for example, to the following values:

$C_4 = 0.6 \quad\quad n1 = 6$
$C_5 = 0.1 \text{ to } 1.0 \quad n2 = 1$

If these values (assuming $C_5 = 0.1$) are substituted for the corresponding constants in the equation (1), then $$K = \left( \frac{0.6 - \alpha_1}{\beta^6 + 1} + \alpha_1 \right) \times \frac{1}{\alpha_2 \times \gamma + 1} \times 0.1 \quad (2)$$

In the equation (2), if the first term on the right side is denoted by $K_1$ and the second term of the right side is denoted by $K_2$, then $$K = K_1 \times K_2 \times 0.1 \quad (3)$$

Accordingly, $K_1$ is determined by the geomagnetic environment index $\beta$ and $\alpha_1$, and $K_2$ is determined by the geomagnetic environment index $\gamma$ and $\alpha_2$.

Figure 9A:
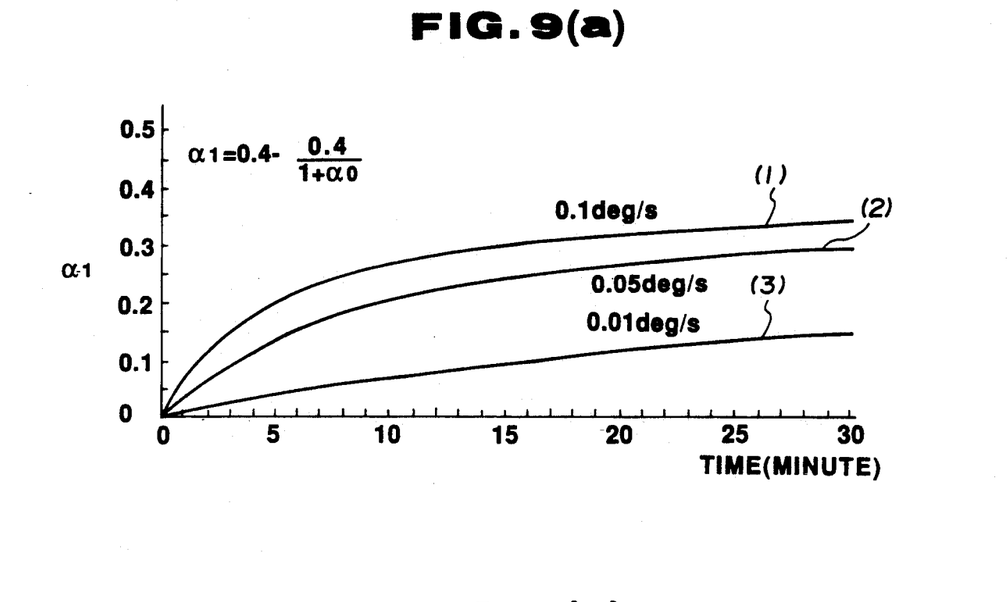
FIG. 9(a) is a graph showing a relationship between an elapsed time and a second gyro drift correction value $\alpha_1$ derived by the preferred embodiment of FIG. 3.

FIG. 9(a) is a graph showing a relationship between the elapsed time and the second correction value $\alpha_1$, wherein a line (1) shows the relationship therebetween for the gyro sensor having a drift characteristic of 0.1 deg/sec, a line (2) for the gyro sensor having a drift characteristic of 0.05 deg/sec and a line (3) for the gyro sensor having a drift characteristic of 0.01 deg/sec. As seen from FIG. 9(a), the second correction value $\alpha_1$ becomes larger with lapse of time and is less with the gyro sensor having less drift error.

Figure 9B:
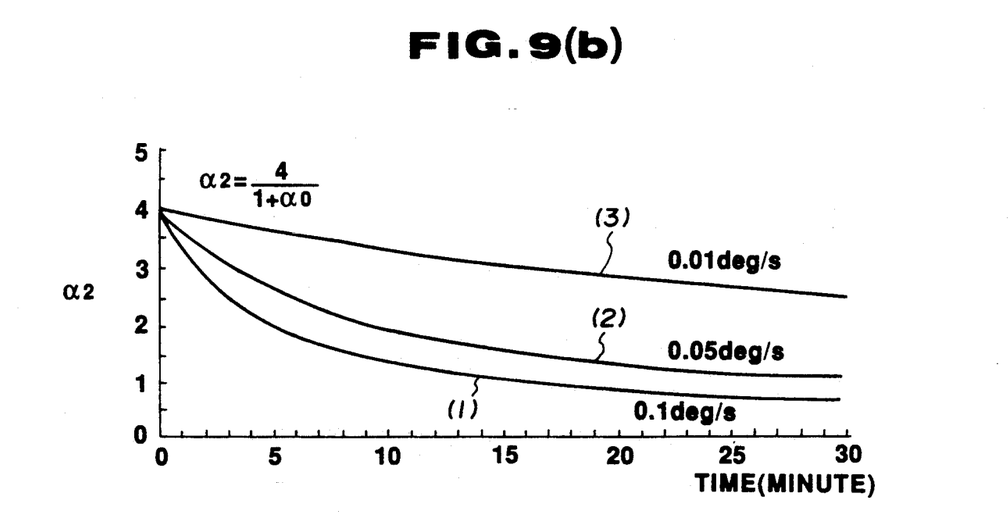
FIG. 9(b) is a graph showing a relationship between an elapsed time and a third gyro drift correction value $\alpha_2$ derived by the preferred embodiment of FIG. 3.

FIG. 9(b) is a graph showing a relationship between the elapsed time and the third correction value $\alpha_2$, wherein a line (1) shows the relationship therebetween for the gyro sensor having the drift characteristic of 0.1 deg/sec, a line (2) for the gyro sensor having the drift characteristic of 0.05 deg/sec and a line (3) for the gyro sensor having the drift characteristic of 0.01 deg/sec. As seen from FIG. 9(b), the third correction value $\alpha_2$ becomes less with lapse of time and is larger with the gyro sensor having less drift error.

Figure 9C:
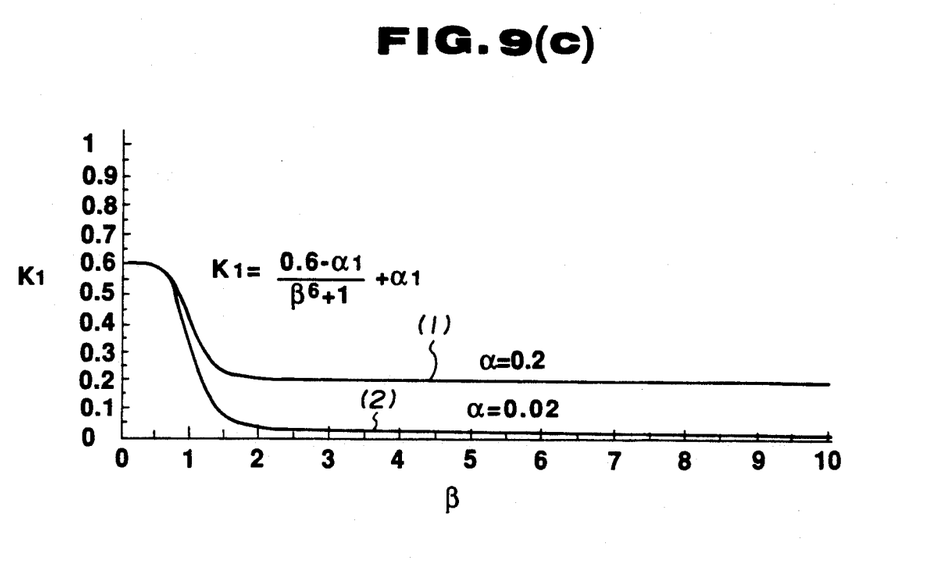
FIG. 9(c) is a graph showing a relationship between a short distance based geomagnetic environment index $\beta$ and a coefficient $K_1$ derived by the preferred embodiment of FIG. 3.

FIG. 9(c) is a graph showing a relationship between the geomagnetic environment index $\beta$ and $K_1$, wherein a line (1) shows the relationship therebetween with the second correction value $\alpha_1$ being 0.2 and a line (2) with the second correction value $\alpha_1$ being 0.02. As seen from FIG. 9(c), $K_1$ becomes less with the index $\beta$ being larger and is larger with the second correction value being larger.

Figure 9D:
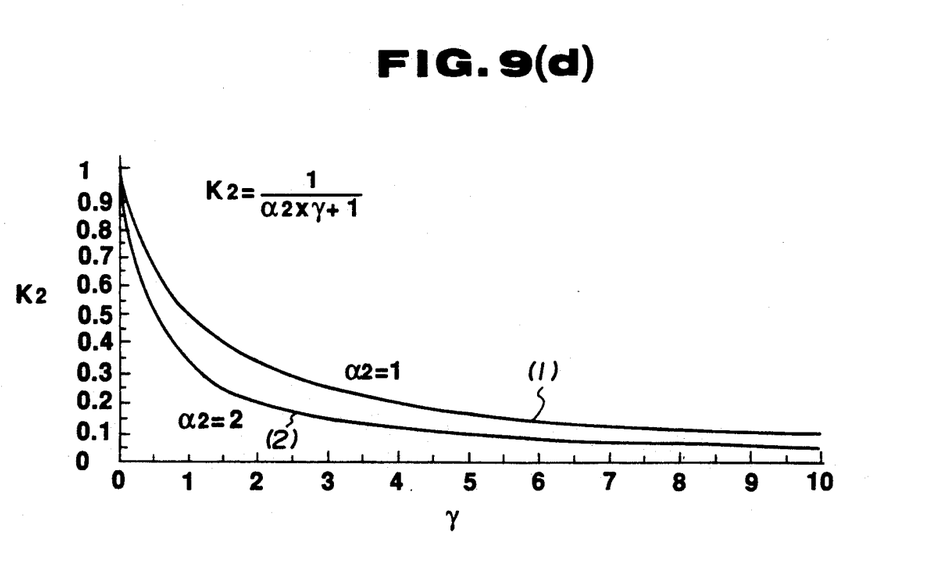
FIG. 9(d) is a graph showing a relationship between a long distance based geomagnetic environment index $\gamma$ and a coefficient $K_2$ derived by the preferred embodiment of FIG. 3.

FIG. 9(d) is a graph showing a relationship between the geomagnetic environment index $\gamma$ and $K_2$, wherein a line (1) shows the relationship therebetween with the third correction value $\alpha_2$ being 1 and a line (2) with the third correction value $\alpha_2$ being 2. As seen from FIG. 9(d), $K_2$ becomes less with the index $\gamma$ being larger and is larger with the third correction value being less.

Further, as seen from FIGS. 9(a) to 9(d), the affection of the indicies $\beta$ and $\gamma$ to $K_1$ and $K_2$ become less with lapse of time from the time point of the correction of the gyro sensor drift at the step 504, due to function of the second and third correction values $\alpha_1$ and $\alpha_2$.

Each of the above-noted constants has the following meaning.

$C_1$ ... The constant $C_1$ determines a degree of effect the gyro sensor drift has on the coefficient K.

$C_2$ ... This constant is the speed of the direction $\theta_2$ derived at the step 520 to approach the absolute direction $\theta_M$ read out at the step 509 in case the disturbance of the geomagnetic field is occurring per the order of several meters while the long distance disturbance is the least ($\beta$ is large, $\gamma$ is zero). As this constant gets less, the approaching speed gets less. Accordingly, the rate of dependence upon the gyro sensor gets larger.

$C_3$ ... This constant is for adjusting an influence of the geomagnetic environment index $\gamma$ upon the approaching speed. Specifically, as this constant gets larger, the influence upon the approaching speed gets larger and the rate of dependence upon the gyro sensor gets larger even when the value $\gamma$ is small.

$C_4$ ... When the disturbance of the geomagnetic field is the least ($\beta = 0$, $\gamma = 0$), the coefficient K gets maximum. The constant $C_4$ is for adjusting this maximum value. As this constant gets larger, the speed of the direction $\theta_2$ derived at the step 520 to approach the absolute direction $\theta_M$ read out at the step 509 gets higher.

$C_5$ ... This constant is for adjusting the approach speed as a whole.

n1 ... This constant is for adjusting the characteristics of $K_1$ to be varied based on the geomagnetic environment index $\beta$. For example, in FIG. 9(c), because this constant is large (n1=6), $K_1$ varies rapidly around $\beta = 1$ both in the lines (1) and (2). Naturally, when the constant n1 gets larger, the variation of $K_1$ around $\beta=1$ gets larger, and when the constant n1 gets smaller, the variation of $K_1$ around $\beta=1$ gets smaller.

n2 ... This constant is for adjusting the characteristics of $K_2$ to be varied based on the geomagnetic environment index $\gamma$. For example, in FIG. 9(d), because this constant is small (n2=1), $K_2$ does not vary rapidly in comparison with $K_1$ in FIG. 9(c). Because $\alpha_2=2$ for the line (2), $K_2$ varies rapidly around $\gamma=\frac{1}{2}$ as this constant gets larger. On the other hand, because $\alpha_2=1$ for the line (1), $K_2$ varies rapidly around $\gamma=1$ as this constant gets larger.

As understood from the foregoing explanation, the values of the constants n1 and n2 are determined depending on whether the coefficient K should be varied rapidly or slowly and whether the coefficient K should be varied rapidly around certain values of the geomagnetic environment indicies $\beta$ and $\gamma$.

Referring back to FIG. 6C, at the steps 528 and 530, the vehicle traveling direction $\theta_2$ derived at the step 520 approaches to the absolute direction $\theta_M$ read out at the step 509. A rate of approach performed at the steps 528 and 530 is determined by the coefficient K. As the coefficient K gets larger, the approach rate gets larger.

For example, at the step 530, when the coefficient K=1, then $$\theta_2 = 1 \times (\theta_M - \theta_2) + \theta_2 = \theta_M$$

Accordingly, the vehicle traveling direction $\theta_2$ derived at the step 520 becomes equal to the absolute direction $\theta_M$ at one execution of the step 530. On the other hand, when the coefficient K=0, the absolute direction $\theta_M$ read out at the step 509 is not reflected at the step 530.

Figure 10:
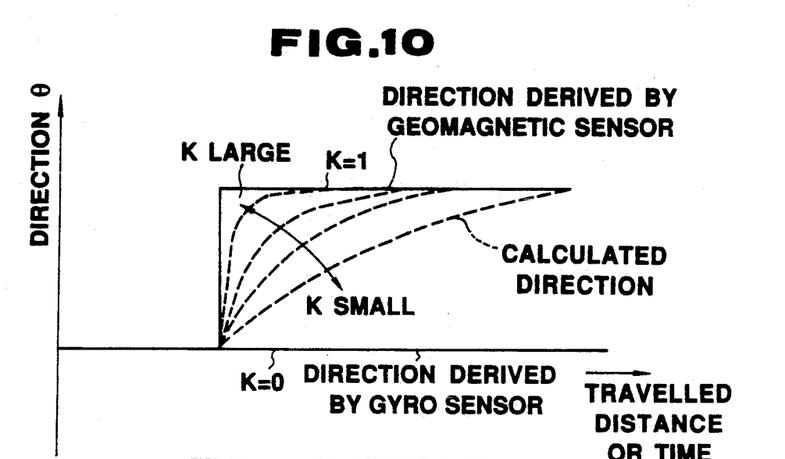
FIG. 10 is a graph of distance or time versus direction showing variations of the traveling direction measurement characteristics according to values of a coefficient K derived by the preferred embodiment of FIG. 3 and FIGS. 11(a)(b)(c) are graphs showing variations of short and long distance based geomagnetic environment indicies $\beta$ and $\gamma$ when disturbance of the long distance geomagnetic field occurs.
Figure 11:
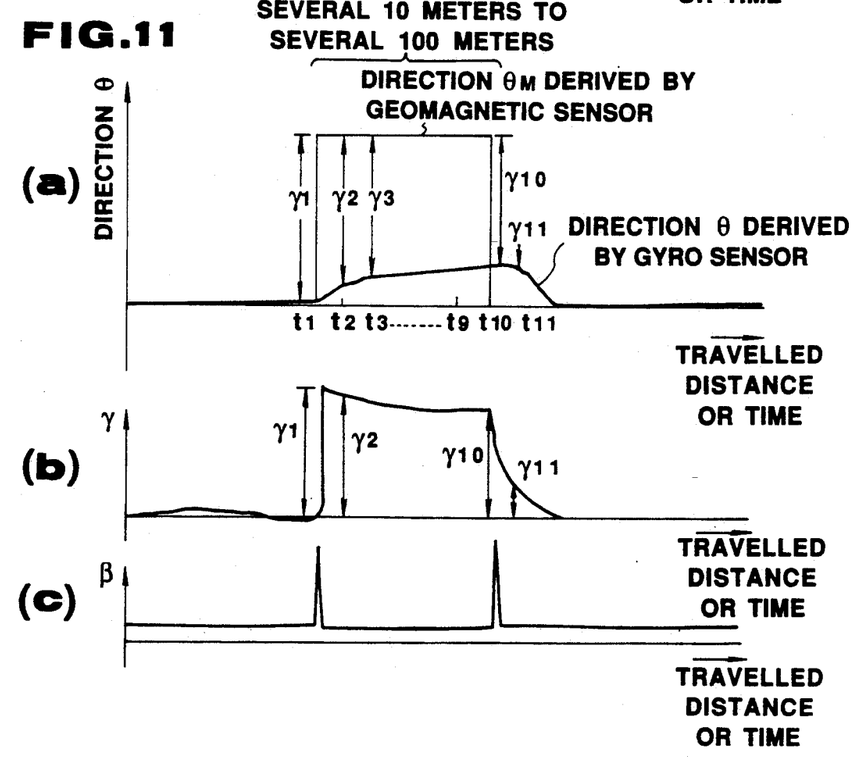

In FIG. 10, the above-noted characteristics are shown. When the vehicle is running on a straight road with a rapid variation in the geomagnetic field, the vehicle traveling direction $\theta_2$ derived at the step 520 approaches the absolute direction $\theta_M$ read out at the step 509 faster with a larger value of the coefficient K and less fast with a lower value of the coefficient K.

Further, immediately after the gyro sensor drift is corrected at the step 504 and when there is no disturbance of the geomagnetic field, then there is no discrepancy in measured directions between the geomagnetic sensor and the gyro sensor. Accordingly, as $\beta=\gamma=0$, $\alpha_1=0$ and $\alpha_2=4$, then $K_1=0.6$ and $K_2=1.0$. Assuming that the constant $C_5=1$, then K=0.6 (a maximum value). On the other hand, when the disturbance of the geomagnetic field is large and, for example, $\beta=\infty$ and $\gamma=\infty$, then K=0. If the condition of K=0 lasts long, then the variation in the vehicle traveling direction is derived solely by the gyro sensor during this condition so that drift error accumulates. However, practically, the coefficient K falls between the minimum value 0 and the maximum value 0.6 and further, is a value corrected by the second and third correction values $\alpha_1$ and $\alpha_2$, so that it is not likely that the condition of K=0 will last long enough to allow significant accumulation of drift error. Accordingly, on a long-term basis, the traveling direction $\beta_2$ derived at the step 520 approaches the absolute direction $\theta_M$ through the step 530 and the drift error is cancelled.

It is to be noted that the step 528 is an instruction for repeating the step 530 as many times as a value of the counter SS. Accordingly, when the value of the counter SS is 2, then the step 530 is repeated twice. On the other hand, when the value of the counter SS is 0, then the process skips step 530 and goes to a step 532 where the counter SS is reset to 0 for a subsequent execution of the interrupt routine.

The repetition of the step 530 is required for deriving a calculation result on a basis of a predetermined distance since this interrupt routine is executed on a basis of the predetermined time $\Delta T$. Accordingly, in this preferred embodiment, it is equivalent to execute the step 530 per a half rotation of the tire since the counter SS is counted up by 1 in response to the counter S counting up 12 times as shown in FIG. 5. Though it is preferable to execute this interrupt routine per a predetermined distance, it is practical to execute same per a predetermined time while the processed result is equivalent to that on a basis of the predetermined distance, due to a problem of calculation load applied to a central processing unit (CPU) of the microcomputer.

Referring back to FIG. 6C, at a step 534, the absolute direction $\theta_M$ read out at the step 509 is stored as $\theta_{MOLD}$ for a subsequent execution of the interrupt routine. At a step 536, the vehicle traveling direction $\theta_2$ derived at the step 530 is stored as $\theta$, and then at a step 538, a current position in the form of X and Y coordinate values is renewed. At the step 538, $\Delta D \times SSSS$ denotes a distance travelled by the vehicle from the prior execution of the interrupt routine. Subsequently, at a step 540, the counter SSSS is reset to 0 for a subsequent execution of the interrupt routine.

It is to be noted that at the initialize step 100 shown in FIG. 4, the vehicle traveling directions $\theta$ and $\theta_{MOLD}$ are initialized to an absolute direction $\theta_M$ which is read out from the geomagnetic sensor at the time of initialization. Further, the counters S, SS, SSS and SSSS are all reset to 0.

Now advantages of using the two geomagnetic environment indicies $\beta$ and $\gamma$ and the second and third correction values $\alpha_1$ and $\alpha_2$ are explained hereinbelow.

As shown in FIG. 11(a), it is assumed that abrupt long distance based disturbance of the geomagnetic field occurs on a basis of the order of several 10 meters to several 100 meters when the vehicle is traveling on a straight road. For simplification, the short distance based disturbance of the geomagnetic field on a basis of the order of several meters is not considered in FIG. 11(a) and thus the geomagnetic environment index $\beta$ is assumed constant.

The geomagnetic environment index $\gamma$ is derived by $\gamma = |\theta_2 - \theta_M|$ at the step 524 as described above. Accordingly, in FIG. 11(a), a difference between the absolute direction $\theta_M$ (corresponding to $\theta_M$ at the step 524) and the vehicle traveling direction $\theta$ (corresponding to $\theta_2$ at the step 524) denotes the index $\gamma$. A variation in value of the index $\gamma$ is shown in FIG. 11(b), wherein it is seen that the value of the index $\gamma$ is held large between time points t1 to t10. Accordingly, $K_2$ becomes small between the time points t1 to t10, and thus the coefficient K also becomes small. Therefore, the approach rate or speed as described above also becomes small.

It is to be appreciated that even while the index $\gamma$ is large, the second and third correction values $\alpha_1$ and $\alpha_2$ cooperatively function to compensate gyro sensor drift error so that accumulation of drift error is effectively avoided.

On the other hand, after the geomagnetic field returns to normal at the time point 10, the index $\gamma$ rapidly gets smaller between time points t10 to t11, and thus the foregoing approach rate gets larger.

FIG. 11(c) shows a variation in value of the geomagnetic environment index $\beta$. As seen from FIG. 11(c), because the value of the index $\beta$ varies only at the time points t1 and t10 in this example, that is, at the time of the variation in the long distance based disturbance of the geomagnetic field, the value of the index $\beta$ remains small between the time points t2 to t9. Accordingly, if the index $\gamma$ is not used in the calculation of the coefficient K, the foregoing approach rate becomes large between the time points t2 to t9 so that the measured direction rapidly approaches the absolute direction $\theta_M$ in FIG. 11(a). Therefore, the finally derived direction is largely deviated from the true traveling direction of the vehicle.

The distance or time axes in FIGS. 11(a), (b) and (c) are all common.

It is to be appreciated that by using the two geomagnetic environment indicies $\beta$ and $\gamma$, it is possible to provide accurate measurement of the vehicle traveling direction even when short and long distance based disturbance of the geomagnetic field occurs. Further, by using the second and third correction values $\alpha_1$ and $\alpha_2$, the gyro sensor drift error is effectively compensated.

Further, the exemplified values of the constants $C_1$ to $C_5$, n1 and n2 are set assuming that the used gyro sensor has a drift error of about 0.1 deg/sec. Accordingly, when using the gyro sensor having less drift error, the values of the constants may be changed to increase the rate of dependence upon the gyro sensor so as to provide a more accurate measurement of the vehicle traveling direction with less effect from disturbances in the geomagnetic field.

It is to be understood that this invention is not to be limited to the embodiments described above, and that various changes and modifications may be made without departing from the spirit and scope of the invention as defined in the appended claims.

What is claimed is:

1. A system for measuring a traveling direction of a vehicle, comprising:
    a geomagnetic sensor, mounted to the vehicle, which produces a first output signal indicative of directional data relating to a geomagnetic field around the vehicle;
    a gyro sensor, mounted to the vehicle, which produces a second output signal indicative of angular variation data independently of the geomagnetic field; and
    a control circuit operatively connected to said geomagnetic sensor and said gyro sensor for receiving said first and second output signals and modifying said first and second output signals to derive a corrected traveling direction based on said modified output signals, said control circuit including:
    first means for deriving a first variation in a traveling direction of the vehicle based on said second output signal from the gyro sensor;
    second means for deriving a first vehicle traveling direction based on said first directional variation;
    third means for deriving a second vehicle traveling direction based on said first output signal from the geomagnetic sensor;
    fourth means for deriving a second variation in said second vehicle traveling direction;
    fifth means for deriving a first value indicative of a disturbance of the geomagnetic field on a short interval basis, said first short interval based value being derived by calculating a difference between said first and second directional variations;
    sixth means for deriving a second value indicative of a disturbance of the geomagnetic field on a long interval basis said second long interval based value being derived by calculating a difference between said first and second vehicle traveling directions;
    seventh means for deriving a first correction value indicative of a drift error causes by said gyro sensor; and
    eighth means for deriving a third vehicle traveling direction as said corrected traveling direction based on said first and second derived vehicle traveling directions by changing a rate of dependence upon said first and second vehicle traveling directions depending on said first short interval based value, said second long interval based value and said first correction value.

2. The system as set forth in claim 1, wherein said eighth means changes said rate of the dependence such that the rate of the dependence upon said first vehicle traveling direction becomes larger and the rate of the dependence upon said second vehicle traveling direction becomes less as said first short interval based value becomes larger, or said second long interval based value becomes larger, or said first correction value becomes less.

3. The system as set forth in claim 1, wherein said eighth means changes said rate of the dependence such that the rate of the dependence upon said first vehicle traveling direction becomes larger and the rate of the dependence upon said second vehicle traveling direction becomes less as the disturbance of the geomagnetic field on the short interval basis becomes larger, or the disturbance of the geomagnetic field on the long interval basis becomes larger, or the drift error becomes less.

4. The system as set forth in claim 1, wherein said seventh means derives second and third correction values based on said first correction value such that said second correction value increases when the first correction value increases and said third correction value decreases when the first correction value increases, and wherein said eighth means changes said rate of the dependence based on said first short interval based value, said second long interval based value and said second and third correction values.

5. The system as set forth in claim 4, further including ninth means for determining whether the vehicle is stopped, and tenth means for correcting said drift error of the gyro sensor when said ninth means determines that the vehicle is stopped.

6. The system as set forth in claim 5, wherein said seventh means derives said first, second and third correction values based on the following equations, respectively.

$$\alpha_0 = DR \times \frac{i}{C_1}$$

$$\alpha_1 = C_2 - \frac{C_2}{1 + \alpha_0}$$

$$\alpha_2 = \frac{C_3}{1 + \alpha_0}$$

wherein, $\alpha_0$, $\alpha_1$ and $\alpha_2$ are the first, second and third correction values, respectively, DR is a drift error caused by the gyro sensor per unit time, i is an elapsed time from a time point where the drift error is corrected by said tenth means, and $C_1$, $C_2$ and $C_3$ are preselected constants, respectively.

7. The system as set forth in claim 6, wherein said eighth means includes eleventh means for deriving a coefficient based on a following equation:

$$K = \left( \frac{C_4 - a_1}{\beta^{n1} + 1} + a_1 \right) \times \frac{1}{(a_2 \times Y)^{n2} + 1} \times C_5$$

wherein, K is said coefficient, $\beta$ is the first short interval based value, Y is the second long interval based value, and $C_4$, $C_5$, n1 and n2 are preselected constants, respectively, and wherein said rate of the dependence varies according to said coefficient such that the rate of the dependence upon said first vehicle traveling direction becomes less and the rate of the dependence upon said second vehicle traveling direction becomes larger as said coefficient becomes larger.

8. The system as set forth in claim 7, wherein said second means derives said first vehicle traveling direction by adding said first directional variation to the third vehicle traveling direction derived in a prior execution of said eighth means.

9. The system as set forth in claim 8, wherein said eighth means derives said third vehicle traveling direction based on a following equation:

$$\theta = K \times (\theta_M - \theta_1) + \theta_1$$

wherein, $\theta$ is the third vehicle traveling direction, K is the coefficient, $\theta_M$ is the second vehicle traveling direction and $\theta_1$ is the first vehicle traveling direction.

10. The system as set forth in claim 1, wherein said fifth means sets said first directional variation to zero when said first directional variation is less than a predetermined value.

11. The system as set forth in claim 1, wherein said short interval basis is per the order of several meters, and said long interval basis is per the order of several 10 to several 100 meters.

12. The system as set forth in claim 1, wherein said eighth means derives said third vehicle traveling direction per predetermined unit time.

13. The system as set forth in claim 12, wherein said eighth means converts said derived third vehicle traveling direction to a value on a basis of a predetermined unit distance travelled by the vehicle.

14. The system as set forth in claim 13, wherein said predetermined unit time is 100 msec and said predetermined unit distance corresponds to a half rotation of a vehicular tire.

* * * * *